United States Patent [19]

Marello et al.

[11] 4,371,134

[45] Feb. 1, 1983

[54] ARTIFICIAL SATELLITE ARRANGEMENT WITH UNFOLDABLE SOLAR GENERATORS AND ANTENNAS

[75] Inventors: Georges Marello; Jean-Claude Vermalle, both of Mandelieu, France

[73] Assignee: Societe Nationale Industrielle Aerospatiale, Paris, France

[21] Appl. No.: 217,662

[22] Filed: Dec. 18, 1980

[30] Foreign Application Priority Data

Jan. 4, 1980 [FR] France ................. 80 00109

[51] Int. Cl.³ .............................................. B64G 1/30
[52] U.S. Cl. .................................... 244/173; 136/292
[58] Field of Search ............... 244/173; 343/881, 882, 343/915; 136/206, 244, 245, 292; 160/206, 213, 229

[56] References Cited

U.S. PATENT DOCUMENTS

| | | | |
|---|---|---|---|
| 3,327,967 | 6/1967 | Schrantz | 244/173 |
| 4,014,617 | 3/1977 | Meston | 244/173 |
| 4,262,867 | 4/1981 | Piening | 244/173 |

OTHER PUBLICATIONS

Schneider, K., "Development and Testing of the ULP Solar Array", European Symp. on Photovoltaic Generators in Space, CESTEC, Netherlands, 11–13, Sep. 1978.

VDI–Zeitschrift, vol. 108, No. 13, pp. 573–578.

Primary Examiner—Charles E. Frankfort
Assistant Examiner—Jesus D. Sotelo
Attorney, Agent, or Firm—Merriam, Marshall & Bicknell

[57] ABSTRACT

The present invention relates to the arrangement of an artificial satellite provided with foldable solar generators and antennas. According to the invention, extensions are provided on the articulated flaps and the proximal panels, in order to be able optimally to adjust the distance of the solar generators with respect to the satellite, so that the articulation between the proximal panel and the flap is located above the folded antennas of which the ends are housed between said extensions. The invention results in elimination of the shadow cast by a satellite on its solar generators and the thermal influence of said satellite on the cells of said generators.

4 Claims, 5 Drawing Figures

PRIOR ART Fig.1
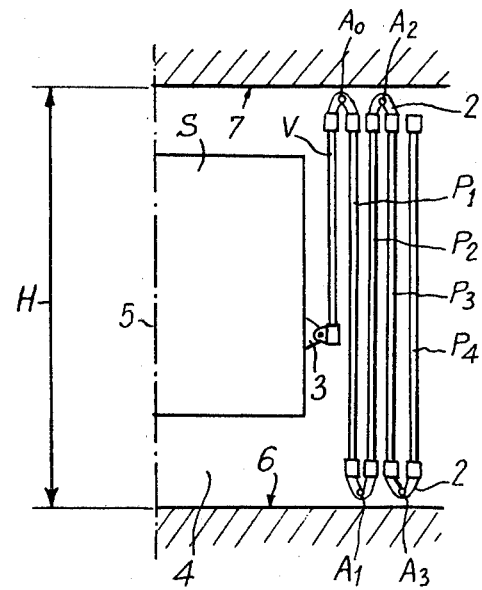
PRIOR ART Fig.2
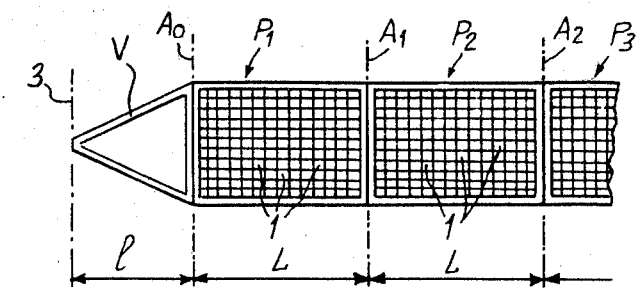
Fig.5
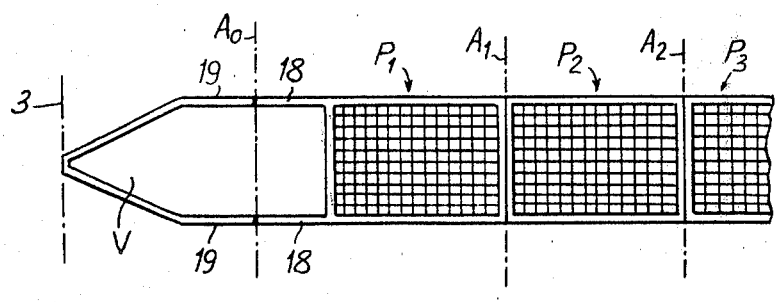

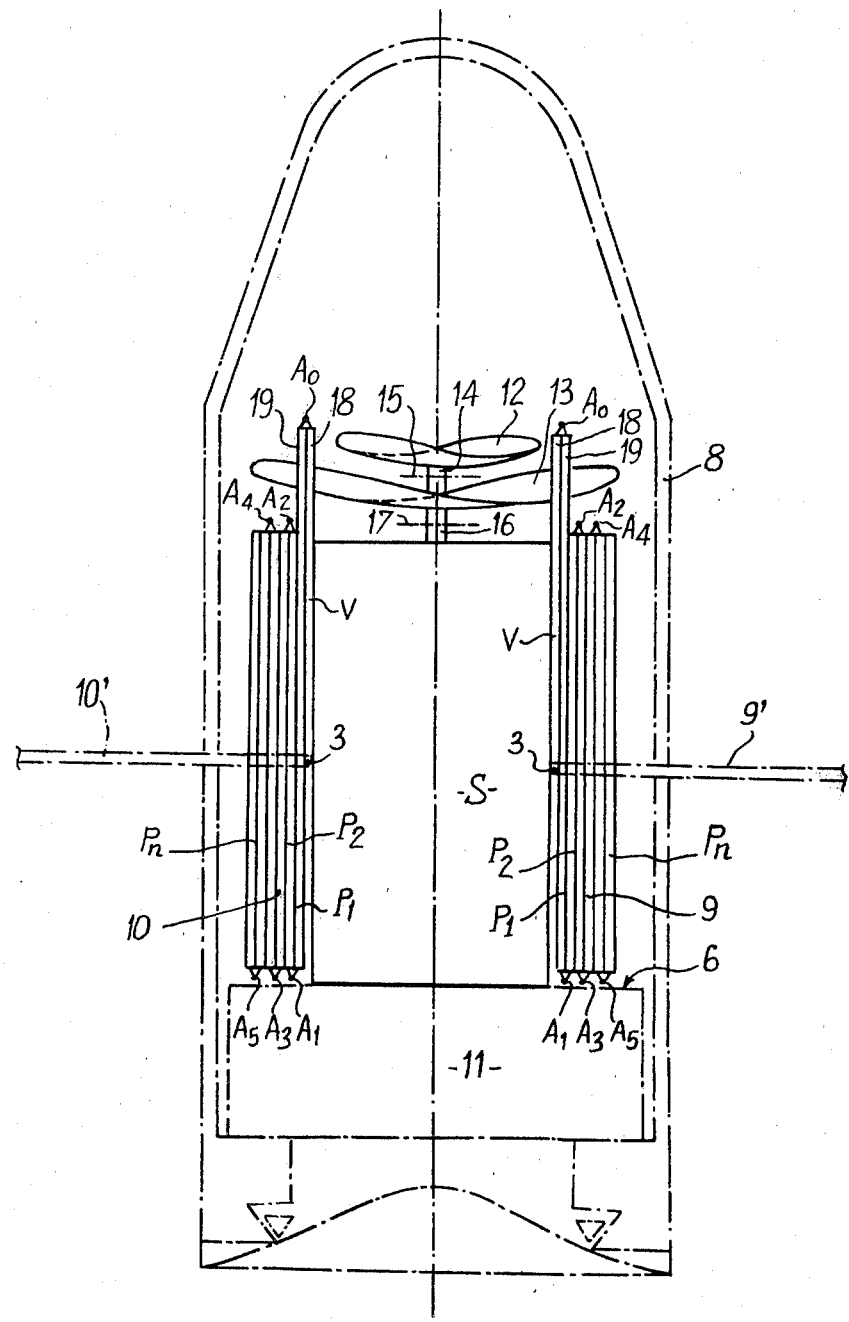

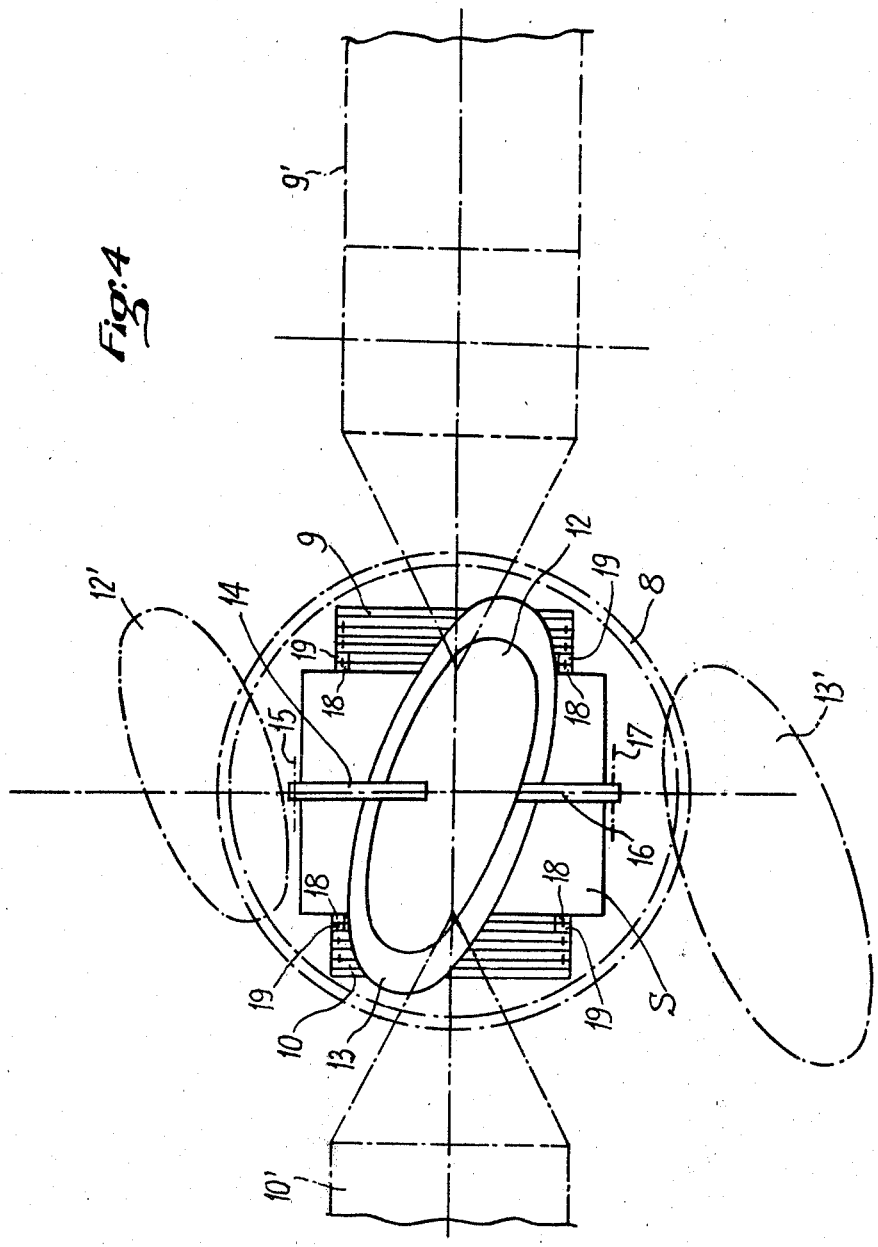

ARTIFICIAL SATELLITE ARRANGEMENT WITH UNFOLDABLE SOLAR GENERATORS AND ANTENNAS

The present invention relates to an artificial satellite arrangement provided with foldable solar generators and antennas.

Artificial satellites are known to be provided with solar generators adapted to supply them with electrical energy, and with antennas for radioelectric transmissions. To be launched and put in orbit, these satellites are disposed in the head or cap of a rocket. The inner volume of such a head being necessarily limited, it is indispensable, for the solar generators and the antennas, to provide a foldable and unfoldable structure so that their dimensions are minimum during launching and they take their operational dimensions and positions when the satellite is in its orbit.

Each solar generator for satellite thus generally comprises an assembly of panels bearing solar cells and articulated on one another in succession so as to occupy either a folded position for launching for which said panels are folded in zig zag form on one another, or an unfolded position for operation for which said panels are at least substantially in line with one another. This assembly of panels is often connected laterally to the body of the satellite by a flap of which one side is articulated on said body and the other side of the proximal end panel. Unfolding of the generator is controlled by a drive mechanism receiving its orders from the satellite.

Similarly, the antennas of the satellite are articulated on the body thereof to occupy either a folded position for launching or an unfolded position for operation.

In folded position, said antennas are most often located straight above the body of the satellite and the solar generators, also in folded position, so that the length of the panels of the solar generators, as well as the length of the flaps articulated on the body of the satellite are limited by consideration of configuration in folded position.

Such a limitation of the length of each of the panels of the solar generators, although disadvantageous, is not otherwise a hindrance, as this may be remedied by changing the number of said panels to obtain the optimum surface of solar cells.

On the other hand, the limitation of the length of the flaps articulated on the body of the satellite is a particularly serious drawback, since, when the solar generators are in unfolded position, this length constitutes the distance of said generators from the body of the satellite. Now, this distance must be at least equal to a minimum length below which the body of the satellite risks casting a shadow on the solar generators and thermally influencing the cells thereof. Present satellite structures, due to the limitation of the length of the articulated flaps, do not make it possible to attain, and, a fortiori, to exceed, this minimum length in all the missions on which the satellites are sent.

It is an object of the present invention to remedy this drawback. Due to the invention, the length of the flap articulated on the body of the satellite, and therefore the distance of a solar generator from said body, may be fixed at any desired optimum value, greater than the above-defined minimum length.

To this end, according to the invention, an artificial satellite arrangement comprising:
a satellite body,
at least one solar generator comprising an assembly of panels bearing solar cells and articulated on one another in succession to occupy either a folded position for which said panels are folded on one another in zig zag form, or an unfolded position for which said panels are at least substantially in line with one another, said assembly of panels being connected laterally to said satellite body by a flap of which one side is articulated on said body and the other side on the proximal end panel, and at least one antenna, articulated on said satellite body to occupy either an unfolded position for which said antenna is located outside said body and said solar generator, or a folded position for which said antenna is straight above said satellite body and said solar generator, also in folded position, towards the articulation of said flap on said proximal panel, is characterised in that, with the shape of said antenna and its articulation on the body of the satellite being provided so that, when the antenna and the solar generator are in folded position, the lateral parts of said generator are not covered by said antenna, the articulation means between said flap and said proximal panel are located at the end of lateral extensions of the latter, these extensions being disposed on either side of said folded antenna.

Thus, due to these lateral extensions of the articulated flap and the proximal panel, the articulation may be disposed therebetween above the antenna and, when the solar generator is in unfolded position, the distance thereof from the satellite may therefore be increased so that this body can neither cast a shadow on the unfolded generator nor exert a thermal influence on the solar cells of said generator.

The invention is particularly easy to carry out. In fact, in almost all satellites, the shape of the antennas is such that their ends straight above the folded solar generators are less wide than said solar generators. It therefore suffices to provide the articulation of said antennas so that, in folded position, the ends thereof are at least substantially centred with respect to the generators, this then allowing the lateral passage of said extensions of the flap and the proximal panel. It is rare to have to change the shape of the antennas. Moreover, the folded position of said antennas will most often allow said extensions to be arranged without additional intervention.

In the most frequent case of each panel of the solar generator comprising a peripheral frame, the extensions fast with said proximal panel will advantageously be constituted by extensions of the longitudinal sides of said frame. It will then be advantageous if the extensions of the articulated flap, whatever the shape of said flap, are such that they are coupled to said extensions of the proximal panel when the solar generator is in folded position, to be in line with the extensions when the generator is in unfolded position.

The present invention further relates to a solar generator for satellite, comprising an assembly of panels bearing solar cells and articulated on one another in succession to occupy either a folded position for which said panels are folded on one another in zig zag form, or an unfolded position for which said panels are at least substantially in line with one another, said assembly of panels being connected laterally to the body of said satellite by a flap of which one side is articulated on said body and the other side on the proximal end panel, whilst said satellite comprises at least one antenna, articulated on said satellite body to occupy either an unfolded position for operation, or a folded position for which said antenna is located straight above towards said satellite body and said solar generator, also in folded position, the articulation of said flap on said proximal panel, this solar generator being characterised in that its articulated flap and its proximal panel comprise opposite lateral extensions between which articulation means are provided, so that, when the solar generator is in folded position, said extensions are located on either side of said folded antenna, said articulation means being on the side opposite the solar generator with respect to the antenna.

The invention will be more readily understood on reading the following description with reference to the accompanying drawings, in which:

FIG. 1 illustrates, in schematic axial half-section, the known assembly of the solar panels of a generator in folded position.

FIG. 2 schematically shows, on a different scale and in plan view, the known assembly of the panels of the generator of FIG. 1, in unfolded position.

FIG. 3 schematically shows in section two solar generators according to the invention, housed in folded position with the associated satellite in the head of a rocket.

FIG. 4 is a schematic plan view corresponding to FIG. 3.

FIG. 5 schematically shows, on a different scale and in plan view, the assembly of the panels of a solar generator of FIGS. 3 and 4 in unfolded position allowing comparison with the known assembly of FIG. 2.

In these figures, like references designate like elements.

Referring now to the drawings, the known solar generator, shown in FIGS. 1 and 2, comprises a plurality of identical solar panels $P_1, P_2, \ldots P_n$ bearing solar cells 1. These solar panels comprise a peripheral frame and are articulated on one another in succession about axes $A_1$, $A_2 \ldots A_{n-1}$ parallel to the corresponding edges of said panels and defined by hinges 2. Furthermore, the end of the panel $P_1$ opposite the axis of articulation $A_1$ is articulated about an axis $A_o$ on a flap V itself articulated at 3 on a drive mechanism provided in the satellite 5.

Due to hinges 2 and 3, the panels $P_1$ to $P_n$ and the flap V may occupy either a folded position in zig zag form as shown in elevation in FIG. 1, or an unfolded position as shown in plan view in FIG. 2. The passage from one of these positions to the other is made by action of the drive mechanism mentioned hereinabove; this may be of any known type and has not been shown in greater detail as it does not form part of the invention.

The flap V is generally of V-structure and is often designated by the term "fork".

The satellite S and its folded solar generator or generators V, $P_1, P_2, \ldots P_n$ are disposed in a housing 4, centred on the axis 5 of the cap forming the head of the launching rocket for placing said satellite in orbit. This housing 4 has a maximum height, defined by a floor level 6 and a ceiling level 7 determined by considerations of lay out of different members about the satellite S, in said cap.

The length L of the panels $P_1$ to $P_n$ (which are all identical) is consequently determined by the height H of the housing 4, it being understood that the maximum value allowed by this height H should advantageously be chosen for the length L.

Furthermore, it is seen that the length l of the flap V is determined on the one hand by the location of the hinge 3, on the other hand by the length L. It will be noted that if the hinge 3 is not located at mid-height (H)/2 in the housing 4 (which is the case in FIG. 1 where the hinge 3 is closer to the floor level 6 than the ceiling level 7), two different lengths may be chosen for the flap V, according to whether the articulation $A_o$ is provided to be towards the floor level 6 or towards the ceiling level 7. For flap V, the larger of the two possible lengths is generally chosen, as shown in FIG. 1.

Thus, in the known layouts, the choice of the length l of the flap V is limited to two possibilities only, fixed by the value of the height H of the housing 4, in which the solar generators are in the folded state when the satellite is launched.

It will be noted that the length l of the flap V represents the distance of the solar generators from the body of the satellite S when the satellite is in orbit and the solar generators are unfolded (FIG. 2) to supply it with electrical energy. This distance, from the foregoing indications, can therefore take only two values determined by the folded configuration of the generators and independent of the unfolded configuration thereof.

Now, it is indispensable to adapt the distance of the unfolded generators from the body of the satellite, on the one hand to avoid the latter casting a shadow on said generators and on the other hand to reduce to a maximum the thermal influence of said satellite on the solar cells 1 of the panels $P_1$ to $P_n$. This distance must therefore present a sufficiently high optimal value, which cannot be obtained in the known assemblies even by choosing the larger of the lengths l determined, as indicated hereinabove, by the folded configuration of said generators.

The floor level 6 is generally determined by compact, solid members such as motor for which it is vertually impossible to change location and/or dimensions. The floor level 6 must therefore be considered as intangible.

On the other hand, the ceiling level 7 is generally determined by relatively less dense mobile members such as folded antennas. With this in mind, the invention will be explained with reference to FIGS. 3 to 5. FIGS. 3 and 4 show a satellite 5, disposed inside a rocket head or cap 8. Two solar generators 9 and 10 are associated with the satellite 5 and are laterally disposed thereon. As shown in FIG. 4, each generator 9 or 10 is constituted by a plurality of articulated panels $P_1$ to $P_n$, of which the proximal panel $P_1$ is articulated on the body of the satellite via a flap V. Thus, each solar generator 9 or 10 may occupy either a folded position (shown in solid lines in FIGS. 3 and 4) or an unfolded position 9' or 10' (shown partially in dashed and dotted lines in FIGS. 3 and 4).

The floor level 6 is determined definitively, for example by motors 11, whilst the ceiling level 7 is determined by folded antennas 12 and 13. Antenna 12 which is for example a reception reflector, is mounted on an arm 14 articulated at 15 with respect to the body of the satellite 5. The antenna 13, which is for example an emission reflector, is mounted on an arm 16 articulated at 17 with respect to the body of the satellite 5.

The antennas 12 and 13 may thus occupy either a folded position (shown in solid lines in FIGS. 3 and 4) or an unfolded position 12' and 13' (shown in dashed and dotted lines in FIG. 4).

As shown in FIG. 4, the lateral parts of the solar generators 9 and 10 are arranged not to be covered by said reflectors either spontaneously or by action on the arms 14 and 16, on the articulations 15 and 17 and/or on the shape of the reflectors 12 and 13. Thus, it is possible to provide opposite lateral extensions 18 and 19 on the flaps V and the proximal panels $P_1$, so that said lateral extensions pass on either side of the folded reflectors 12 and 13 and the axes $A_o$ are located on the opposite side of the generators 9 and 10 with respect to said reflectors, i.e. thereabove.

In unfolded position (cf. FIG. 5), the distance separating the hinge 3 from the proximal edge of the panel $P_1$, instead of being equal to l as in the known technique, is equal to the distance l increased by the sum of the lengths of the extensions 18 and 19.

Thus, by adequately choosing the lengths of the extensions 18 and 19, the distance of the unfolded solar generators from the body of the satellite may be adapted as a function of the specific needs of the missions on which said satellite is sent.

It will be noted that, for satellites which have already been constructed and which present the adequate configuration of the reflectors in folded position, the improvement according to the invention is made without modification of the panels $P_2$ to $P_n$, by simply adding extensions 18 and 19 to the flaps V and to the panels $P_1$. Such an addition is easy, since it suffices to extend the longitudinal sides of the frames forming said panels $P_1$ and to provide similar extensions on the flaps V.

It will further be noted that the panels $P_2$ to $P_n$ remain interchangeable and that the number of hinges $A_o$ to $A_{n-1}$ does not increase, so that the mass and rigidity of the improved solar generators of the invention are virtually identical to those of the known generators.

What is claimed is:

1. In an artificial satellite arrangement comprising a satellite body, at least one solar generator comprising an assembly of panels bearing solar cells and articulated on one another in succession to occupy either a folded position in which said panels are folded on one another in zig-zag form, or an unfolded position in which said panels are at least substantially in line with one another and project outwardly from said body, a flap having one end articulated to said body and the other end articulated to a proximal panel in said assembly of panels, and at least one antenna articulated on said body to occupy either an unfolded position in which said antenna is located laterally away from said body or a folded position in which said antenna is located directly above said body and said assembly of panels, when said assembly is folded, the improvement comprising:

lateral extensions rigidly affixed to and projecting from each of said flap and said proximal panel and articulation means interconnecting the free ends of said extensions, said extensions projecting toward said folded antenna when said assembly of panels is folded, said extensions being laterally spaced by a distance sufficient to clear said folded antenna.

2. The arrangement of claim 1, in which the panels of the solar generator comprise a peripheral frame, wherein the extensions fast with the proximal panel are constituted by extensions of the longitudinal sides of said frame.

3. The arrangement of claim 2, wherein the extensions of the flap, are such that they are coupled to said extensions of the proximal panel when the solar generator is in folded position, and in line with said extensions when the generator is in unfolded position.

4. A solar generator for use in satellites comprising:

an assembly of panels bearing solar cells, said panels being articulated on one another in succession to occupy either a folded position in which said panels are folded on one another in zig-zag form, or an unfolded position in which said panels are substantially in line with one another;

a flap having one end articulated to a proximal panel of said assembly and an opposite end adapted to be articulated to the body of a satellite;

said flap and said proximal panel each having opposed spaced lateral extensions rigidly affixed thereto, the opposed extensions being articulated to each other to permit folding of said assembly with the articulated ends of said extensions projecting toward an upper end of said satellite body.

* * * * *